(12) United States Patent
Chen et al.

(10) Patent No.: US 8,401,191 B2
(45) Date of Patent: Mar. 19, 2013

(54) EFFICIENT BROADCAST ENTITLEMENT MANAGEMENT MESSAGE DELIVERY MECHANISM USING A SCHEDULED DELIVERY WINDOW

(75) Inventors: An Mei Chen, San Diego, CA (US); Jangwon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 784 days.

(21) Appl. No.: 12/357,976

(22) Filed: Jan. 22, 2009

(65) Prior Publication Data

US 2009/0190757 A1 Jul. 30, 2009

Related U.S. Application Data

(60) Provisional application No. 61/023,262, filed on Jan. 24, 2008.

(51) Int. Cl.
*H04N 7/169* (2011.01)
*H04L 29/06* (2006.01)

(52) U.S. Cl. ........... 380/242; 380/277; 380/239; 726/27

(58) Field of Classification Search ................. 380/239, 380/242
See application file for complete search history.

(56) References Cited

U.S. PATENT DOCUMENTS

| | | | |
|---|---|---|---|
| 6,584,199 B1* | 6/2003 | Kim et al. | 380/203 |
| 6,898,285 B1* | 5/2005 | Hutchings et al. | 380/200 |
| 2002/0120928 A1* | 8/2002 | Wajs | 725/25 |
| 2004/0123313 A1* | 6/2004 | Koo et al. | 725/31 |
| 2005/0025312 A1* | 2/2005 | Rijkaert et al. | 380/37 |
| 2006/0004661 A1* | 1/2006 | Bacon | 705/50 |
| 2006/0046640 A1* | 3/2006 | Ooi | 455/3.02 |
| 2007/0261076 A1* | 11/2007 | Puputti | 725/25 |

FOREIGN PATENT DOCUMENTS

| | | |
|---|---|---|
| EP | 0975109 | 1/2000 |
| EP | 1793603 | 6/2007 |
| WO | 2005/091635 | 9/2005 |
| WO | 2006/005030 | 1/2006 |
| WO | 2006/110446 | 10/2006 |

OTHER PUBLICATIONS

Kirkels et al.,"A Security Architecture for Pay-Per-View Business Models in Conditional Access Systems", Oct. 29, 2007, DRM, pp. 1-9.*
Jiang et al., "Key Distribution for Conditional Access System in DTV Broadcasting", 2004, ICCS, pp. 326-330.*
International Search Report, PCT/US2009/031770, International Searching Authority, European Patent Office, May 6, 2009.
Written Opinion, PCT/US2009/031770, International Searching Authority, European Patent Office, May 6, 2009.
International Preliminary Report on Patentability, PCT/US2009/031770, International Preliminary Examining Authority, European Patent Office, Apr. 7, 2010.
Nishimoto Y., et al., "Conditional Access System Using Broadcasting for Narrow-band Mobile Broadcasting Systems," Journal of the Institute of Image Information and Television Engineers, Japan, The Institute of Image Information and Television Engineers, May 1, 2007, vol. 61, No. 5, pp. 674-680.

* cited by examiner

*Primary Examiner* — Matthew Smithers (74) *Attorney, Agent, or Firm* — Arent Fox, LLP (57) ABSTRACT

Systems and methods include broadcasting an entitlement management message (EMM) in a communication system using a scheduled delivery window. The systems and methods including receiving a EMM broadcast window from a distribution system, listening for the EMM during the EMM broadcast window, and receiving the EMM from the distribution system during the EMM broadcast window.

52 Claims, 8 Drawing Sheets

|  | Receiving Real-time without EMM broadcast reception | Receiving Real-time with EMM broadcast reception |
|---|---|---|
| Current consumption | 193 mA | 207 mA |
| Playtime on 900 mA Hr battery | 4.66 Hours | 4.35 Hours |

EFFICIENT BROADCAST ENTITLEMENT MANAGEMENT MESSAGE DELIVERY MECHANISM USING A SCHEDULED DELIVERY WINDOW

CLAIM OF PRIORITY UNDER 35 U.S.C. §119

The present Application for Patent claims priority to Provisional Application No. 61/023,262 entitled "Efficient Broadcast Entitlement Management Message Delivery Mechanism Using a Scheduled Delivery Window" filed Jan. 24, 2008, and assigned to the assignee hereof and hereby expressly incorporated by reference herein.

BACKGROUND

Communication networks have been designed to deliver media content to recipients using cable, satellite, and mobile television. Delivery may be by unicast (one to one) or broadcast (one to many). In a subscription-based system, for example, in order to receive the content an Entitlement Management Message (EMM) is first delivered to a wireless device, also referred to as the subscriber unit. The EMM may be delivered using unicast or broadcast delivery. The EMM includes secret data, such as a logical key, which enables a user to access media content that has been protected, such as by encryption, so that only authorized users can access the content.

For new subscriptions and changed subscriptions, unicast EMM delivery is often a preferred method for connected devices. For example, in satellite and cable television services, a set top box is connected to the phone line in order to receive the EMM for initial activation. In contrast, media content services for wireless devices, such a mobile television, differ in that the device usually has connectivity through a cellular data service or an Internet service. This allows the new or changed subscription to take effect immediately.

For devices with no unicast connection, also known as unconnected devices, EMM delivery occurs via broadcast. In some cases, even with connected devices, broadcast delivery may be preferred. This may be true for subscription renewals, especially for subscriptions that require periodic renewal. For example, in a television service network the number of subscribers could be large, possibly in the millions. If an EMM were to be sent to each device individually the network would be too congested to successfully process the renewal subscriptions. Broadcast delivery allows the EMM to be addressed to any subscriber unit capable of receiving the broadcast, thus saving bandwidth.

In broadcast delivery in a mobile television network, the network repeatedly broadcasts the EMMs for the next subscription renewal period. The repetition rate is known as the cycle time. Cycle time is the period between two instances of broadcasting the EMMs destined for a given mobile station. The cycle time may be a function of the bandwidth and the number of subscribers. Thus, for example, if the number of subscribers is large and the amount of bandwidth allocated for the broadcast is limited, the cycle time may be longer.

Conventionally, EMM broadcast delivery in an existing mobile television network occurs while the user is watching content, the user's device tunes to the channel where the EMMs are being broadcast while the user is watching content. The mobile station receives all the EMMs broadcast during this time and processes them to determine the EMMs relevant to the user's device. The mobile television operator selects the cycle time such that if the user watches mobile television for a period of time during the day, the network will guarantee reception of the EMM with some probability. The network does not know when the user will turn on the mobile television application, nor how long the user will watch television. Because of this the EMM broadcast cycle time is typically small. Otherwise, the user may fail to watch content during the EMM cycle time because the unit does not have the most recent EMM available.

In the above case, given that the re-broadcast rate is high, one problem with this method of EMM delivery is consuming a significant amount of bandwidth. Mobile television broadcast bandwidth is quite expensive and operators wish to use as much bandwidth as possible to deliver content, which generates revenue. Another problem with the current EMM delivery mechanism is that while the user is watching content, the device needs to monitor the EMM channels over the air to see if its respective renewal EMM is being broadcast. This causes considerable device battery drain since the device must demodulate the flows in their respective channels and receive all the EMMs being broadcasted and then search for the ones relevant to the device.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One aspect relates to a method for a distributor to control access to distributed content. The method may include receiving subscriber information for a plurality of subscribers authorized to receive one or more portions of distributed content. The method may also include classifying the plurality of subscribers as a member of one of a plurality of groups according to a grouping function and further based on the respective subscriber information. In addition, the method may include defining one or more group-specific access mechanisms for each of the plurality of groups, wherein each of the one or more group-specific access mechanisms provides access to the one or more portions of distributed content. Further, the method may include determining a group-specific entitlement management message window within an entitlement management message for each of the plurality of groups, wherein each group-specific entitlement management message window corresponds to specified time of a broadcast of the one or more group-specific access mechanisms corresponding to the respective one of the plurality of groups. Moreover, the method may include providing the plurality of subscribers with a respective group-specific entitlement management message window, wherein an occurrence of each group-specific entitlement management message window is operable to cause a communication device of the respective subscriber to tune to a broadcast channel to receive the entitlement management message. Additionally, the method may include broadcasting the entitlement management message comprising the respective group-specific access mechanisms with the respective group-specific entitlement management message windows.

Another aspect relates to a method for a communication device to obtain an entitlement management message (EMM) in a communication system. The method may include receiving, at a communication device and from a distribution system, an EMM broadcast window for an identified group of a plurality of groups of communication devices, wherein the EMM broadcast window comprises a specified time, wherein the communication device is a member of the identified group. In addition, the method may include tuning by the communication device to a broadcast channel, based on an occurrence of the specified time, to listen for the EMM during the EMM broadcast window. Moreover, the method may include receiving the EMM from the distribution system during the EMM broadcast window.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as the MediaFLO system from Qualcomm, Inc., Digital Video Broadcasting-Handheld (DVB-H or DVB-H2), Digital Video Broadcasting-Satellite services to Handhelds (DVB-SH), Digital Multimedia Broadcasting (DMB), Digital Video Broadcasting-Terrestrial (DVB-T), Integrated Services Digital Broadcasting (ISDB), CDMA, TDMA, FDMA, OFDMA, SC-FDMA, BCMCS (Broadcast and Multicast Services), MBMS (Multicast Broadcast/Multicast Service) and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM□, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Figure 1:
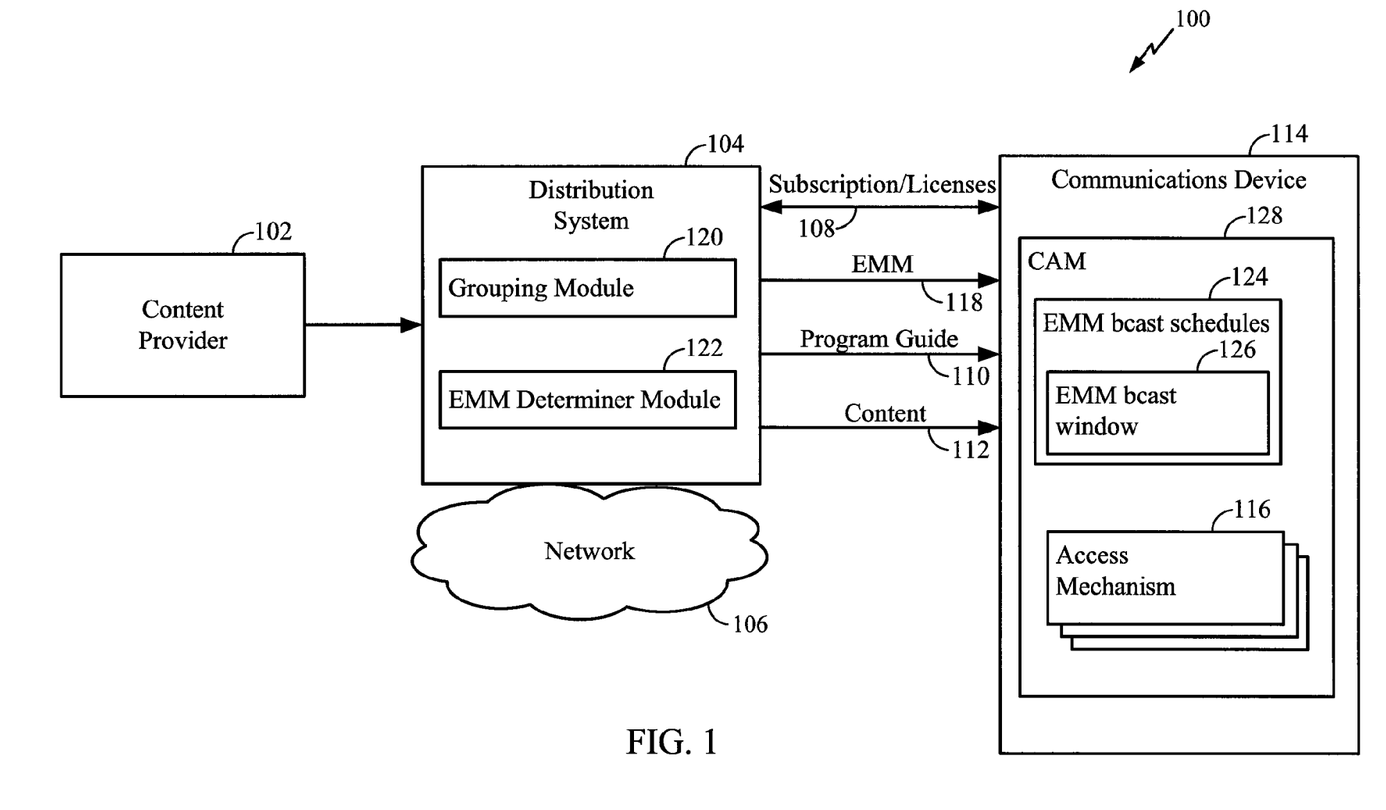
FIG. 1 is a schematic diagram illustrating a communication system in accordance with one aspect.

Turning now to the schematic diagram in FIG. 1, illustrated is a high level block diagram of a communication system 100, in accordance with an aspect. System 100 includes one or more content providers 102 that provide media content 112 to a distribution system 104. For example, the media content 112 may include, but is not limited to, audio data, video data, text, graphics, streaming data or any other type of data that defines a medium for communicating information. In one case, for example, media content 112 includes television programming, although it may also include music, clips, movies, etc. Further, media content 112 may be categorized into services or programming packages. Services may represent a series of programs or channels, and programming packages may include a grouping of programs or channels. Content provider 102 may include, for example, international media providers, national media providers, local media providers, and Internet content providers, among other content providers. Distribution system 104 receives media content 112 from content provider 102 and distributes the media content 112 over network 106 to one or more communication devices 114. In addition, distribution system 104 may provide communication device 114 with subscriptions and licensing 108 options for accessing media content 112, along with programming guides 110 that provide a schedule of the media content 112.

In order to control access to content 112, distribution system 104 may apply a security mechanism to some or all of the distributed content 112 such that it can only be viewed or played by authorized devices. For example, distribution system 104 may encrypt content 112 prior to transmission to the one or more communication devices 114. Each communication device 114 becomes authorized to access content 112 by selecting one or more subscription and licensing options 108, which results in distribution system 104 providing the respective communication device 114 with one or more access mechanisms 116, such as a logical key, e.g. an encryption/decryption key, which enables decrypting of the encrypted content 112. For example, each of the one or more access mechanisms 116 may correspond to one or more of the encrypted content 112, such as corresponding to a subscription type, package of channels, a specific program, etc.

In order to prevent unauthorized parties from discovering the one or more access mechanisms 116, distribution system 104 frequently replaces existing access mechanisms with new access mechanisms. Distribution system 104 notifies and provides authorized ones of the communication devices 114 with the new, updated access mechanism(s) 116 via an Entitlement Management Message (EMM) 118. For example, a single EMM 118 having a one or more access mechanisms 116 for each of a plurality of subscribing communication devices 114 may be broadcast continuously, and each communication device 114 monitors the broadcast of EMM 118 to listen for its respective access mechanisms 116. The time between EMM 118 broadcasts of access mechanisms 116 corresponding to a respective communication device 114 is referred to as cycle time.

Additionally, as system 100 may have a large number, such as many millions, of subscribing communication devices 114, distribution system 104 may provide many different access mechanisms 116 for different groups of subscribing communication devices 114 so that if one access mechanism 116 is compromised, the entire system 100 is not affected. Accordingly, distribution system 104 includes a grouping module 120 operable to determine one or more groups into which respective ones of the subscribing communication devices 114 may be classified as a member.

Further, in order to reduce the time spent by each subscribing communication device 114 in monitoring the broadcast of EMM 118, distribution system 104 further includes an EMM determiner module 122 operable to determine an EMM broadcast schedule 124 for each of the groups of subscribing communication devices 114. Each EMM broadcast schedule 124 includes one or more EMM broadcast windows 126, which define one or more specified times, including ranges or periods of time, identifying an occurrence of the portion of the continuously broadcast EMM 118 containing access mechanism(s) 116 specific to the respective group of subscribing communication devices 114.

Additionally, each subscribing communication device 114 includes a conditional access module (CAM) 128 operable to manage acquisition of access rights and content, and to manage decoding of content. CAM 128 obtains the respective EMM broadcast schedule 124 pertaining to the device, based on the group in which the device is a member. When EMM broadcast window 126 occurs, CAM 128 wakes communication device 114 or otherwise causes it to tune to the respective broadcast channel to receive EMM 118, and thus receive the one or more access mechanisms 116 pertaining to the group to which communication device 114 is a member. Then, CAM 128 is operable to utilize the one or more access mechanisms 116 to decrypt the encrypted content 112, thereby enabling authorized presentation of content 112 on communication device 114.

Figure 2:
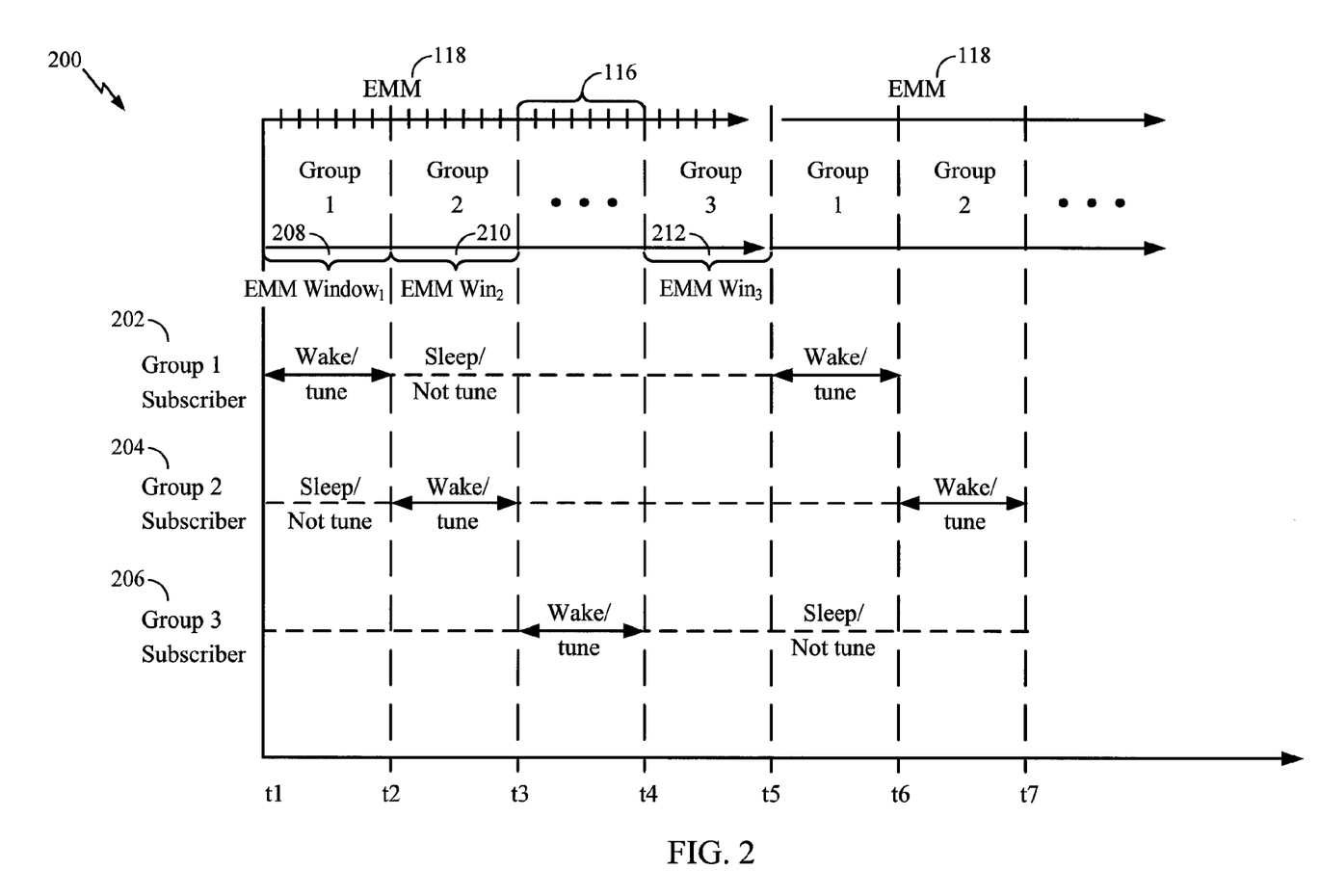
FIG. 2 is an illustration of an example methodology that facilitates providing a broadcast delivery mechanism in accordance with another aspect.

Referring now to FIG. 2, illustrated is an example methodology 200 that facilitates providing a broadcast delivery mechanism in accordance with an aspect. EMM 118 with access mechanisms 116 may be broadcast continuously during a cycle time. For example, the cycle time for EMM 118 is time $t_o$ to time $t_4$, and then the EMM 118 repeats again starting at time $t_4$. Further, access mechanisms 116 specific to the respective groups may be included in different portions of EMM 118. For example, portions pertaining to Groups 1 to n, where n represents the total number of groups, may be include the respective message portions from t0 to t1, from t1 to t2, and from t3 to t4, respectively. Correspondingly, in an aspect, communication devices 114 may be classified into corresponding groups according to a grouping function based upon the respective subscriber information and grouping factors, as discussed in more detail below. For example, communication devices 114 may be grouped into Group 1, Group 2, and up to Group n, identified by reference numbers 202, 204 and 206, respectively.

Grouping communication devices 114 together allows for each group of communication devices 114 to receive a group-specific EMM broadcast window indicating when the EMM information for the particular group will arrive. For example, Group 1 may receive EMM broadcast window 208, Group 2 may receive EMM broadcast window 210, and Group n may receive EMM broadcast window 212. In an aspect, Group 1 may wake up and/or tune to EMM 118 during EMM broadcast window 208 to listen for Group 1 group-specific access mechanisms 116. Group 1 may then sleep and/or not tune to EMM 118 during the other time periods. Group 2 up to Group n may sleep and/or not tune to EMM 118 during broadcast window 208. However, Group 2 up to Group n may wake up and/or tune to EMM 118 during each group's specific broadcast windows and listen for the group's specific access mechanisms 116. Thus, these aspects conserve battery power on each communication device 114 by limiting tuning in and listening to the broadcast of EMM 118 to specific, known times.

Figure 3:
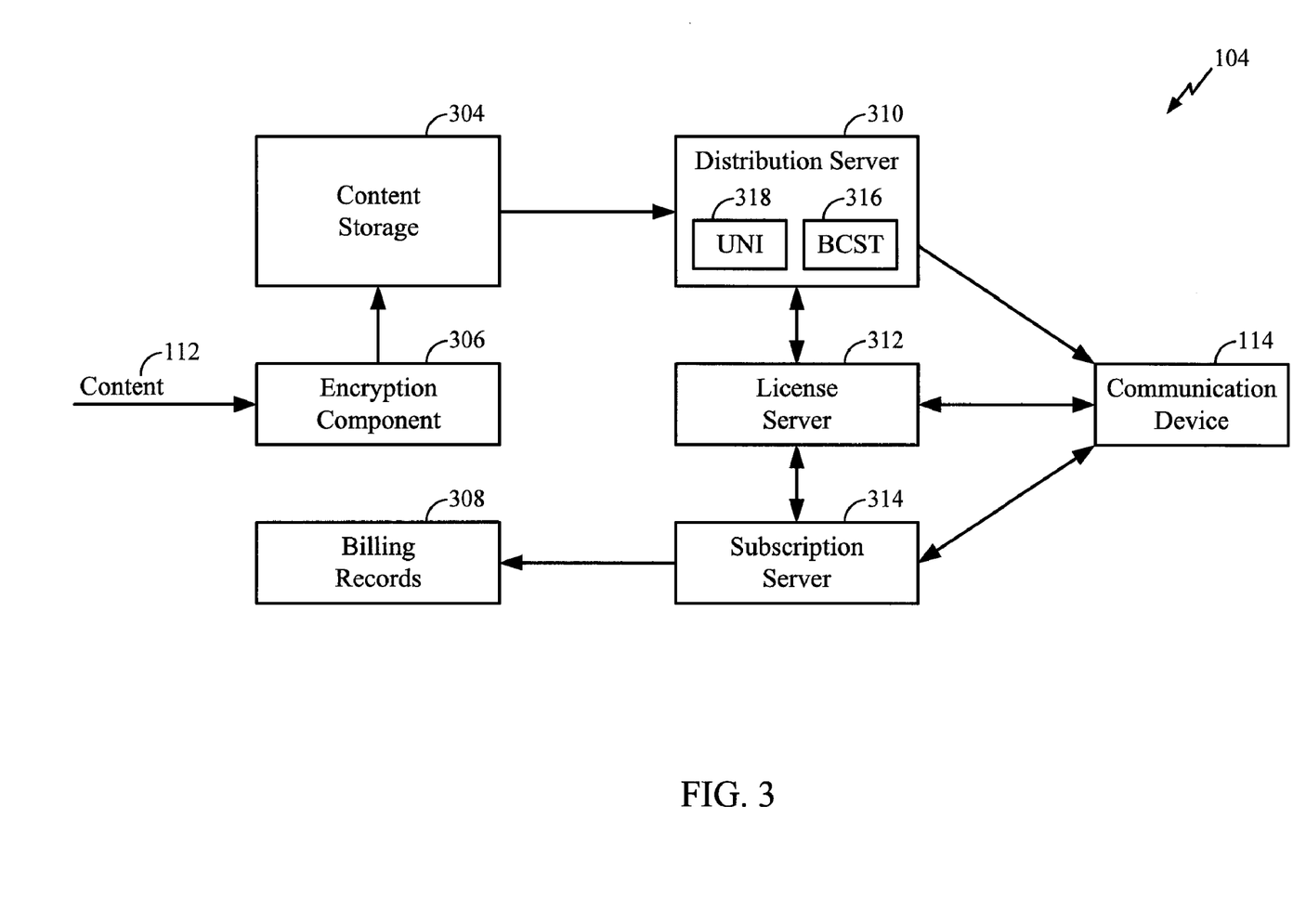
FIG. 3 is a block diagram illustrating a distribution system of a communication system in accordance with another aspect.

Referring now to the block diagram in FIG. 3, illustrated is an example distribution system 104 (FIG. 1) in accordance with an aspect. Distribution system 104 may include one or more computing devices having one or more processors operable to execute instructions, which may be stored in a memory, to perform the functionality described herein. For example, distribution system 104 may include distribution server 310, license server 312 and subscription server 314, which work together to manage the content 112 provided by content provider 102 (FIG. 1), subscriptions for the content 112, and the schedule for delivery of the content to communication device 114. In addition, distribution system 104 may manage the rights associated with the content.

Subscription server 314 may process the subscription and account management requests from communication device 114. Subscriptions may include adding or removing channels of media programming that communication device 114 receives. In addition, subscription server 314 may interface with billing records 308 to provide payments to content providers 102 (FIG. 1) for the received content 112.

License server 312 may deliver the necessary license information for content 112 to communication device 114. In another aspect, license server 312 may deliver the necessary license information for content 112 to distribution server 310. Distribution server 310 may then deliver the license information for content 112 to communication device 114. The license information may include the rights and keys provided by encryption component 306 for content 112, including EMM 118 and access mechanism(s) 116. The license information allows communication device 114 to successfully access and play content 112.

Distribution server 310 may deliver content 112 and programming guides to communication device 114. In addition, distribution server 310 may include scheduling information to optimize delivery of content 112 to communication device 114 with respect to network 106 (FIG. 1) conditions. Content 112 may be stored in content storage 304 until distribution server 310 schedules the delivery of content 112 to communication device 114. In an aspect, distribution server 310 may include a broadcast component 316 generating a one-to-many transmission of one or more portions of the above-described information, and/or a unicast component 318 for a one-to-one or limited one-to-many, e.g. multicasting, of one or more portions of the above-described information.

Figure 4:
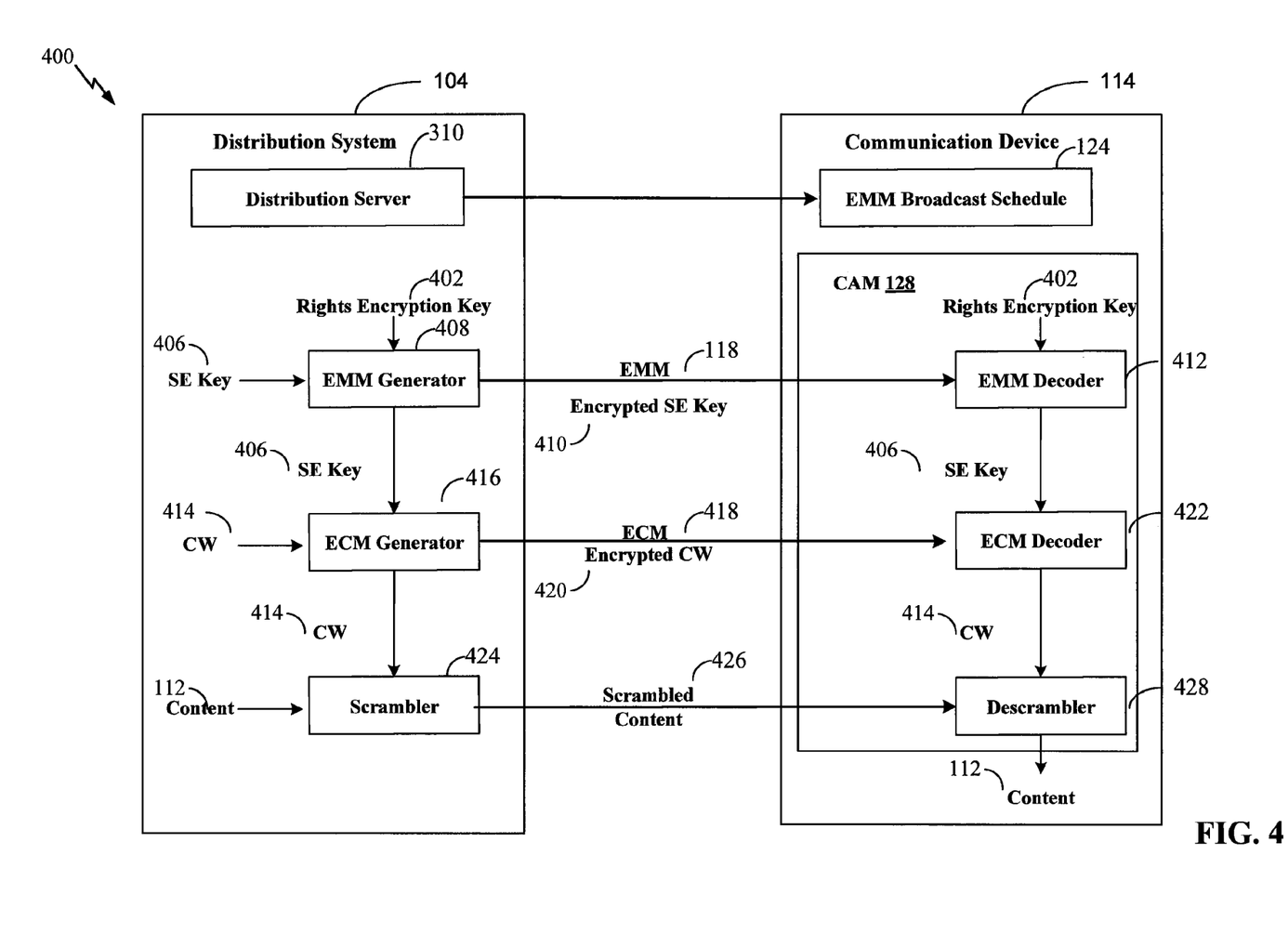
FIG. 4 is an illustration of an example methodology that facilitates encryption of content in accordance with yet another aspect.

Turning to FIG. 4, illustrated is an example security functionality 400 that facilitates secure distribution of content and content access rights in accordance with an aspect. As discussed above, in this aspect, distribution server 310 of distribution system 104 provides communication device 114 with EMM broadcast schedule 124 such that conditional access module 128 can perform the following functionality. Prior to sending and receiving content 112, rights encryption key (RE Key) 402 may be exchanged between distribution system 107 and communication device 114. Rights encryption key 402 allows communication device 114 to decrypt and authenticate rights and subsequently access content 112. In an aspect, rights encryption key 402 may be preconfigured at communication device 114.

Next, EMM generator 408 may receive rights encryption key 402 and service encryption key (SE Key) 406. Rights encryption key 402 may be used for encrypting service encryption key 406. Service encryption key 406 may be used for accessing entitlement control message (ECM) 418. Thus, EMM generator 408 may generate and broadcast EMM 118 containing an encrypted service encryption key 410 to communication device 114.

Further, ECM generator 416 may receive service encryption key 406 and control word (CW) 414. Control word 414 may be encrypted using service encryption key 406. Further, control word 414 may comprise a key, which may be used by communication device 114 for descrambling scrambled content 426. Therefore, ECM generator 416 may generate and broadcast ECM 418 including encrypted control word 420 to communication device 114. In an aspect, ECM 418 may also include additional information to control access to content 112, such as, for example, additional access criteria.

Additionally, a scrambler 424 may receive control word 414 and content 112. Scrambler 424 may scramble content 112 using control word 414 and broadcast scrambled content 426 to communication device 114.

In communication device 114, EMM decoder 412 may receive EMM 118 containing encrypted service encryption key 410. EMM decoder 412 may use rights encryption key 402 for decoding EMM 118 and extracting service encryption key 406. Upon decoding service encryption key 406, EMM decoder may forward service encryption key 406 to ECM decoder 422.

ECM decoder 422 may receive a unicast, multicast and/or broadcast containing ECM 418 including encrypted control word 420. ECM decoder 422 may use the service encryption key 406 received from EMM decoder 412 for decoding ECM 418 and extracting control word 414. ECM decoder 422 may provide control word 414 to descrambler 428.

Descrambler 428 may use control word 414 to descramble the received scrambled content 426 producing content 112. Thus, communication device 114 may use various access mechanisms, such as rights encryption key 402, service encryption key 406, and control word 414, for example, to decrypt and authenticate rights associated with content 112.

Additionally, it should be noted that the broadcast system described herein may be a single frequency network (SFN) or a multi-frequency network (MFN). Accordingly, in an aspect, EMM 118 and/or ECM 418 may contain decryption information for content on the same frequency, e.g. the SFN scenario, as well as content on other frequencies, e.g. the MFN scenario. For example, in one scenario, there is a basic frequency that the communication device will listen to for control related information, e.g. EMM 118 and/or ECM 418, while in an idle mode. In some scenarios, it may make sense to send the keys for all frequencies in that channel on the basic frequency. Thus, latency may be reduced in switching frequencies if communication device 114 already has the access mechanisms for content on other frequencies.

Figure 5:
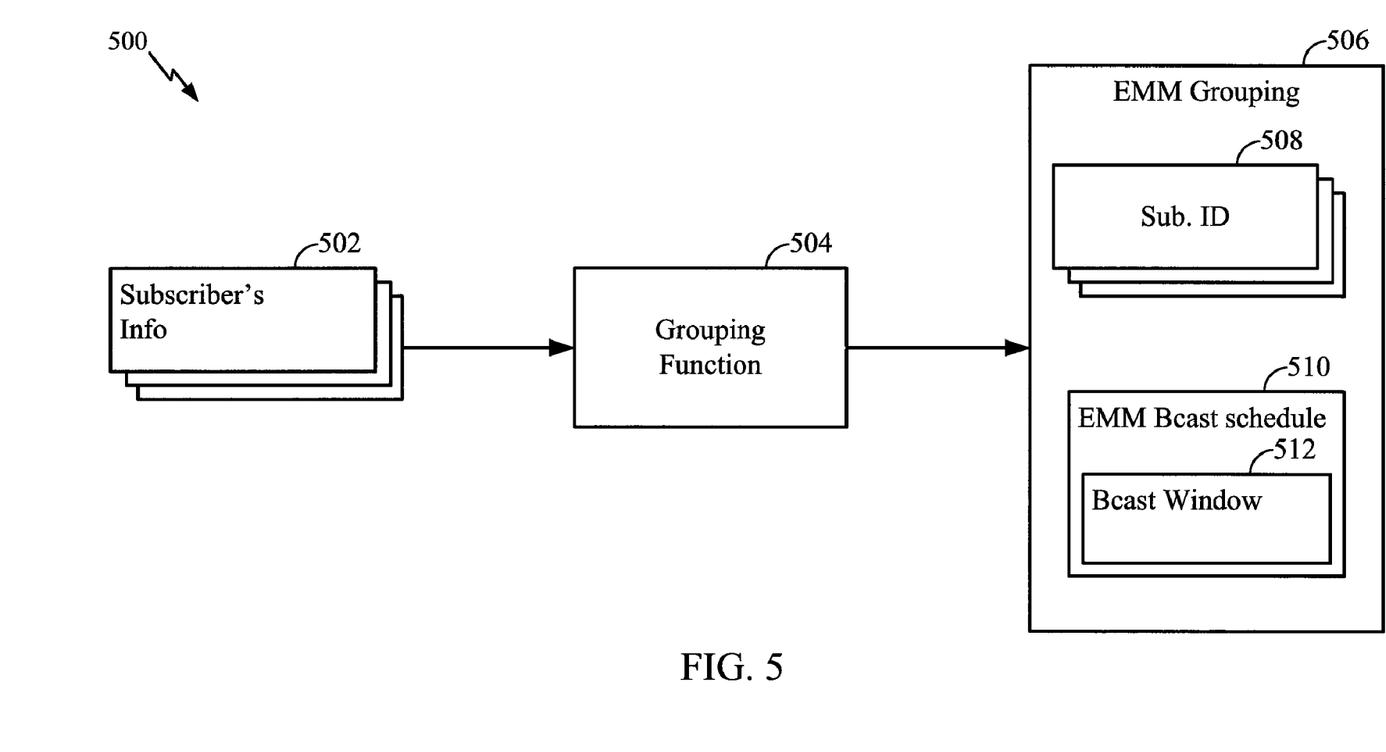
FIG. 5 is an illustration of an example grouping methodology that facilitates the grouping of mobile devices in accordance with another aspect.

Turning now to FIG. 5, illustrated is an example grouping methodology 500, which may be implemented by grouping module 120 (FIG. 1), that facilitates the classification of communication devices 114 in accordance with an aspect. Communication devices 114 may be dynamically grouped together based upon a grouping function 504, which may include one or more grouping factors, and then such groups can be associated with group-specific EMM information. For example, the one or more grouping factors may include a subscription package, a membership level, a device type, and an access type, among other grouping factors.

Grouping communication devices 114 based upon subscription packages may include grouping according to similar programming channels. Similar programming channels may include movie channels, sport packages, news and weather channels, among other programming channels. A subscription package may include, for example, adding or removing programming channels that communication device 114 receives. Grouping communication devices 114 according to a membership level may include, for example, grouping communication devices together that have paid for a premium broadcast schedule, such as a shorter EMM cycle time, among other membership levels. Grouping communication devices 114 based upon device type may include, for example, a communication device 114 that has more technological capabilities to receive an EMM broadcast, among other device capabilities. Grouping based on access type, for example, may be based on, for example, available bandwidth or maximum throughput.

Further, subscriber's information 502 corresponding to each communication device 114 may be provided to grouping function 504. Subscriber's information 502 may include subscription packages, membership level, a device type, or access type, among other subscriber information. Grouping function 504 may determine an EMM group 506 for communication device 114 based upon a combination of the subscriber information and one or more grouping factors, as discussed above.

In an aspect, each EMM group 506 may include subscriber identification (ID) 508 that identifies the communication devices 114 included in EMM group 506. Further, each EMM group 506 may include EMM broadcast schedule 510 having one or more EMM broadcast windows 512. As discussed above with respect to FIG. 2, EMM broadcast window 512 may refer to a period of time when EMM information pertaining to the communication devices 114 of group 506 is available. Thus, based on the respective EMM group 506, a respective communication device 114 may wake up at the appropriate time to listen for and/or receive the broadcast EMM for group 506. Further, any new unconnected communication devices subscribing to a subscription package may use the broadcast window to determine when the broadcast EMM will be available for the communication device. For example, assume there are 2 millions users in the system and it takes 30 minutes to cycle through all the keys. If a new unconnected device is just subscribed to the service, the system may not be able to interrupt the broadcast cycle right away to send its key. By looking at the broadcast window, the new unconnected device and the system will know when the key for the new unconnected device will be available. This solves one of the frustrations that a new user experienced in prior art systems, e.g. knowing when the new user can start watching TV after the new user called up the customer representative and paid for the new service in the unconnected device model. In these prior art systems, the system operators often told people it takes about a day to activate the service. Then, the system operators would often get calls from anxious customers who kept checking when the service will be active. These problems are avoided in the described aspects, because with the broadcast window information, the CAM 128 (FIG. 1), for example, can provide exact service start time information to the user, for example, by presenting the information, e.g. as audio, video, graphics, etc., on a user interface, thereby informing the user as to when the user can start using the service. Therefore, the new unconnected communication device may provide the user of the communication device information indicating when the user may start using the services in connection with the subscription package, for example, watching television.

Correspondingly, referring back to FIG. 1, EMM determiner module 120 is operable to determine the parameters of a respective portion of EMM 118 for each EMM group 506. In other words, based on the above-described grouping factors, EMM determiner module 120 may determine how many EMM windows per EMM cycle to include for each group, as well as the respective time period for each EMM window. Thus, EMM determiner module 120 can configure EMM 118 to service the needs or desires of various groups, or to service the needs or desires of the operator of distribution system 104.

Additionally, as mentioned above, providing specific windows of the EMM message to a particular group of mobile devices reduces the amount of time necessary for mobile devices to listen for the EEM message as compared to prior art solutions. Thus, the amount of bandwidth required for EMM delivery is reduced and also unnecessary tuning to EMM channels in the communication device is eliminated. Moreover, if a mobile device gets compromised, grouping the mobile devices together allows for easier troubleshooting techniques that do not affect all devices in the system. For example, the keys of the group that contains the compromised mobile device may be refreshed without having to change the keys for the whole network.

Figure 6:
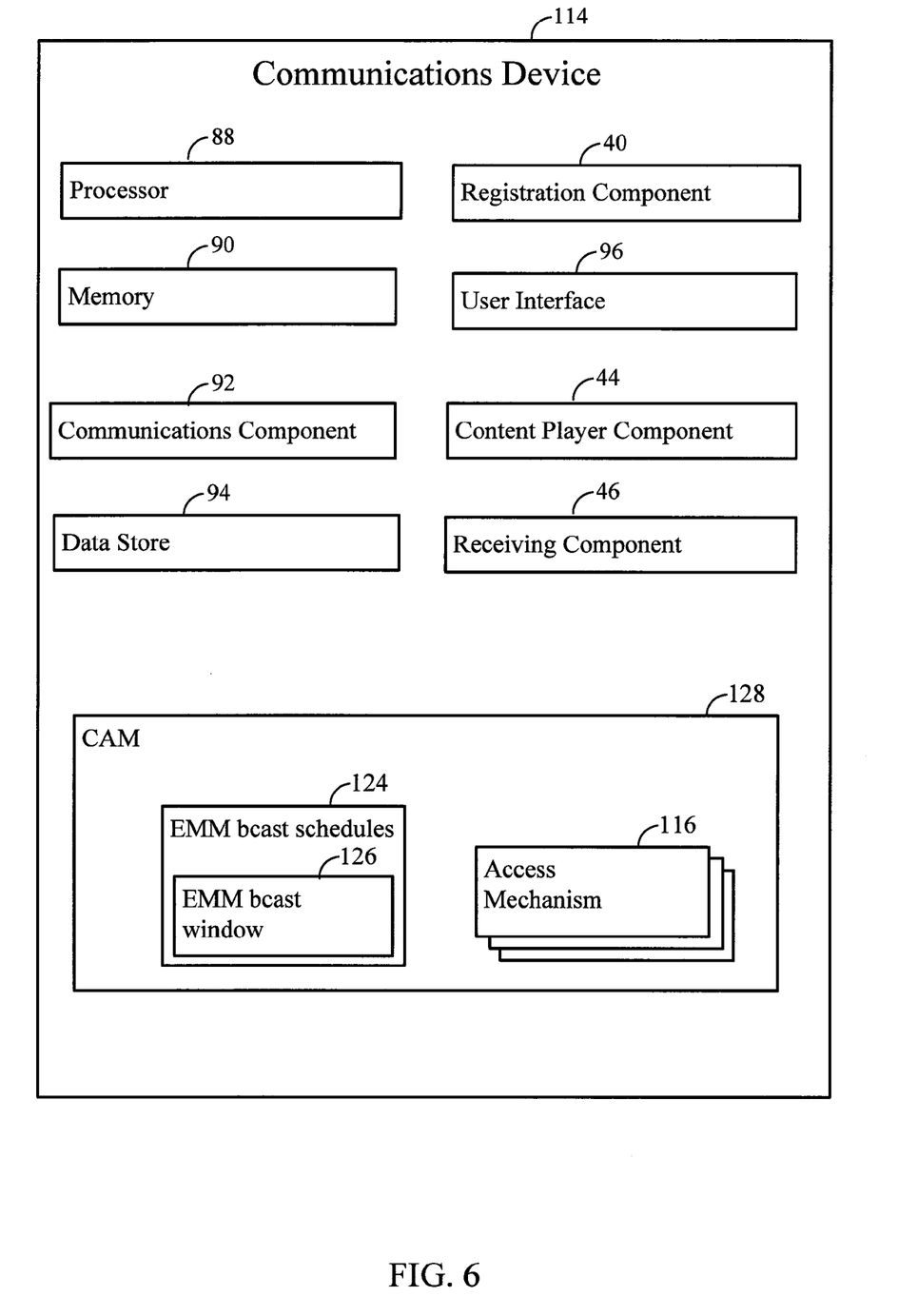
FIG. 6 is an illustration of an example communication device for employment within the communication system in accordance with yet another aspect.

Referring to FIG. 6, in one aspect, communication device 114 (FIG. 1) may include a processor 88 for carrying out processing functions associated with one or more of components and functions described herein. Processor 88 can include a single or multiple set of processors or multi-core processors. Moreover, processor 88 can be implemented as an integrated processing system and/or a distributed processing system.

Communication device 114 further may include a memory 90, such as for storing local versions of applications being executed by processor 88. Memory 90 can include any type of memory usable by a computer, such as random access memory (RAM), read only memory (ROM), tapes, magnetic discs, optical discs, volatile memory, non-volatile memory, and any combination thereof.

Further, communication device 114 may include a communications component 92 that provides for establishing and maintaining communications with one or more parties utilizing hardware, software, and services as described herein. Communications component 92 may carry communications between components on communication device 114, as well as between communication device 114 and external devices, such as devices located across a communications network and/or devices serially or locally connected to communication device 114. For example, communications component 94 may include one or more buses, and may further include transmit chain components and receive chain components associated with a transmitter and receiver, respectively, operable for interfacing with external devices.

Additionally, communication device 114 may further include a data store 94, which can be any suitable combination of hardware and/or software, that provides for mass storage of information, databases, and programs employed in connection with aspects described herein. For example, data store 94 may be a data repository for applications not currently being executed by processor 88, or for storing received media content 112.

Communication device 114 may additionally include a user interface component 96 operable to receive inputs from a user of communication device 114, and further operable to generate outputs for presentation to the user. User interface component 96 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 96 may include one or more output devices, including but not limited to a display, a speaker, a haptic feedback mechanism, a printer, any other mechanism capable of presenting an output to a user, or any combination thereof.

Additionally, in some aspects, communication device 114 may include a registration component 40 operable to register communication device 114 with distribution system 104. During this registration process, an encryption/decryption key, e.g. access mechanism(s) 116, may be exchanged between communication device 114 and distribution system 104 for authenticating and decrypting content distributed to communication device 114. Moreover, in some aspects, communication device 114 may include CAM 128 operable to obtain and manage acquisition of access rights and content, and decoding of content. CAM 128 may include EMM broadcast schedules 124, EMM broadcast window 126 and access mechanisms 116, that enables decrypting and/or descrambling of encrypted and/or scrambled content 112. Furthermore, in some aspects, communication device 114 may include receiving component 46 operable to receive EMM broadcast window information from distribution system 104.

Further, in some aspects, communication device 114 may include content player component 114 operable to display or play content 112. For example, content player component 114 may play content 112 on user interface 96, such as a display and/or speakers, among other outputs.

Figure 7:
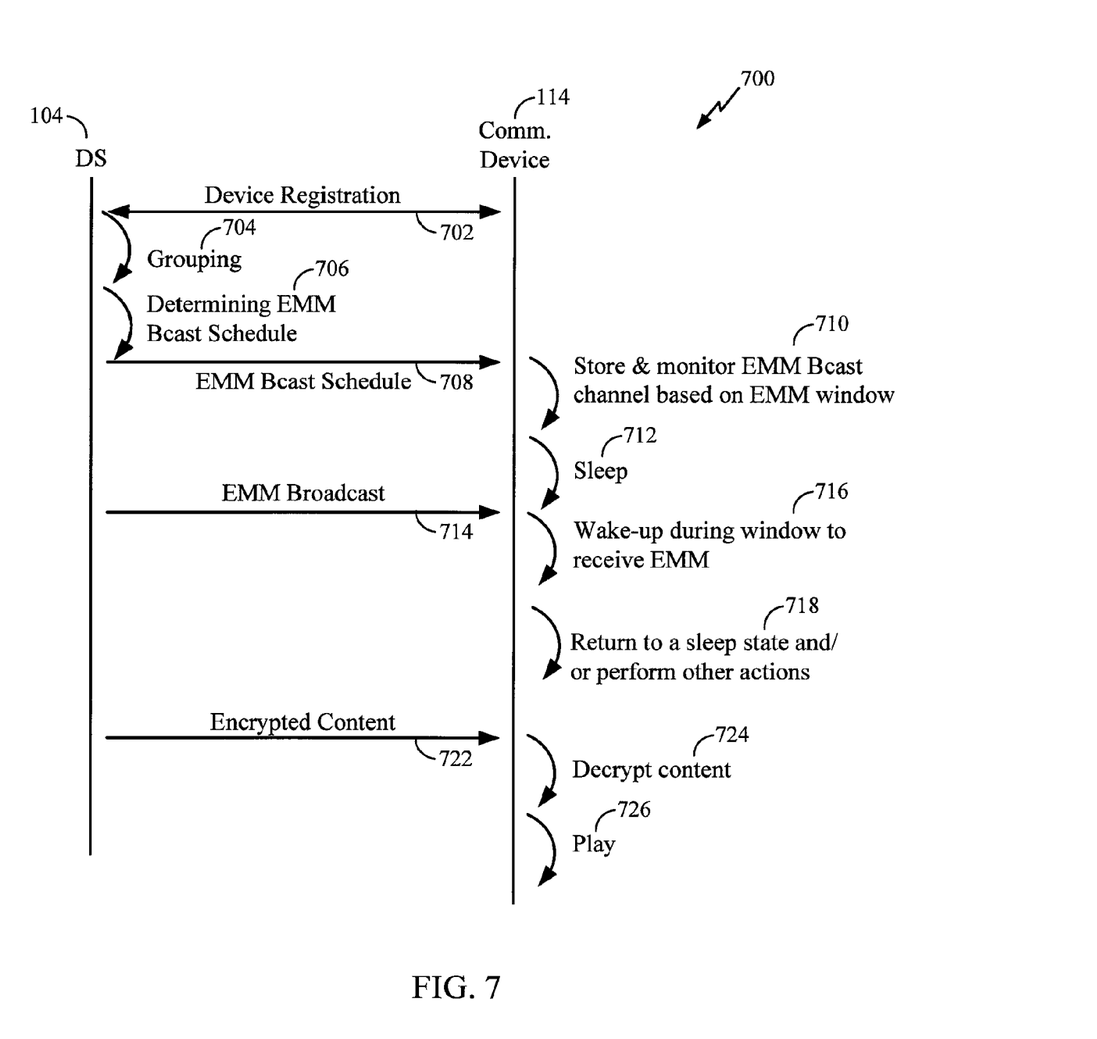
FIG. 7 is an illustration of an example methodology that facilitates receiving an EMM message in accordance with still another aspect.

Referring now to FIG. 7, illustrated is an example methodology 700 that facilitates receiving an EMM message in accordance with an aspect. In a first step 702, communication device 114 registers with distribution system 104. This registration process may include exchanging encryption/decryption keys between distribution system 104 and communication device 114. Exchanging encryption/decryption keys allows communication device 114 to decrypt and authenticate rights and subsequently access the content provided by distribution system 104. In another aspect, the rights encryption key, such as a long term key, may be preconfigured at communication device 114.

In step 704, distribution system 104 may determine one or more groups into which respective communication devices 114 may be classified based upon a grouping function. In addition, distribution system 104 may determine group-specific access mechanisms for providing access to one or more portions of distributed content. Next, in step 706, distribution system 104 may determine an EMM broadcast schedule for each group of the subscribing communication devices 114. In step 708, distribution system 104 sends an EMM broadcast schedule to communication device 114 indicating when communication device 114 should wake up and/or tune into the broadcast schedule. The EMM broadcast schedule may include an EMM broadcast window referring to a period of time when a specific EMM will be available to communication device 114. EMM broadcast window information may be provided in a variety of ways, including system information delivery or a generic notification mechanism. Communication device 114 may store and/or monitor the EMM broadcast channel based upon the EMM window. In step 712, after receiving EMM broadcast schedule, communication device 114 may return to a sleep state.

Next, in step 714, distribution system 104 sends an EMM broadcast which may include the respective group-specific entitlement management message windows. Communication device 114 may wake-up and/or tune to receive the EMM during the broadcast window, in step 716. With the broadcast window information, regardless of whether the user is currently viewing content, communication device 114 may wake up at the appropriate time to tune and/or receive the broadcast EMMs for the desired group. After receiving the EMM, communication device 114 may return to a sleep state and/or perform other actions in step 718 and otherwise not expend resources unnecessarily tuning to the EMM broadcast channel.

Next, distribution system 104 may send encrypted content to communication device 114 in step 722. In step 724, communication device 114 may decrypt the received, encrypted content from distribution system 104 using the STK. After communication device 114 decrypts the content, the mobile station may play and/or display the content in step 726.

A number of advantages may be realized by advertising the EMM broadcast windows in advance. Knowing when to wake up reduces battery consumption and extends viewing or other usage time for the device user. In addition, knowing when to wake up reduces latency. The communication device may wake up to receive the EMM broadcast and go back to sleep. Thus, a user can start watching television when they turn on the TV application without having to wait for the EMM broadcast. In addition, the device may download the EMM during a routine background wakeup for checking the state information of the communication device. Thus, minimizing the cost associated with waking up and receiving the EMM broadcast. A further advantage allows for longer EMM broadcast cycle times than is possible with current methods. Current methods require a relatively short EMM broadcast cycle time to ensure that mobile devices receive the EMM. A longer EMM broadcast cycle time reduces the broadcast bandwidth needed for EMM broadcast delivery.

Figure 8:
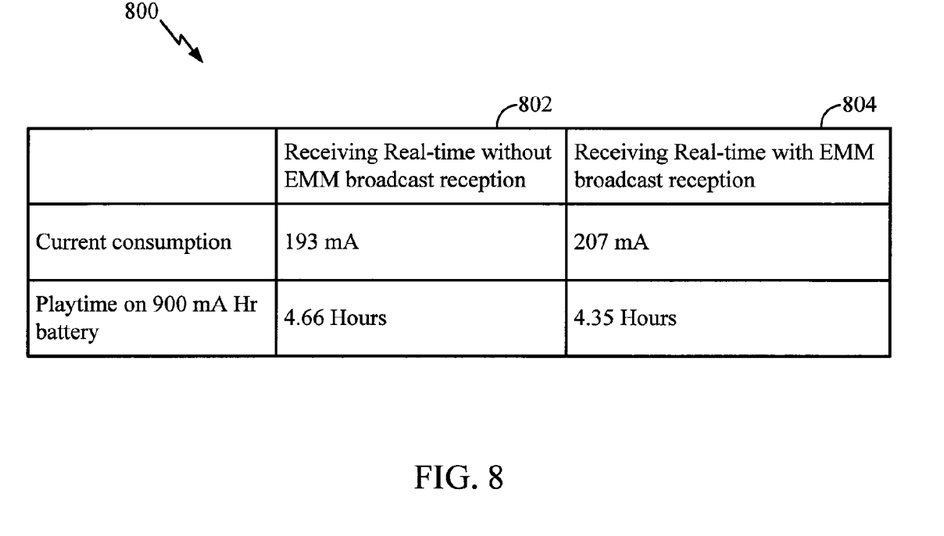
FIG. 8 is an illustration of an example battery consumption comparison in accordance with yet another aspect.

Referring to FIG. 8, illustrated is an example of a chart 800 comparing battery consumption in accordance with an aspect. Chart 800 compares current consumption in mA versus playtime on a 900 mA Hr battery. Column 802 indicates the savings in battery life for the methodology discussed above. Since communication device 114 wakes up during the specified EMM broadcast window, which is relatively shorter than the entire-real time reception duration, loss of playtime is reduced. Column 804 indicates a mobile device receiving real-time the EMM broadcast results in a loss in playtime.

Figure 9:
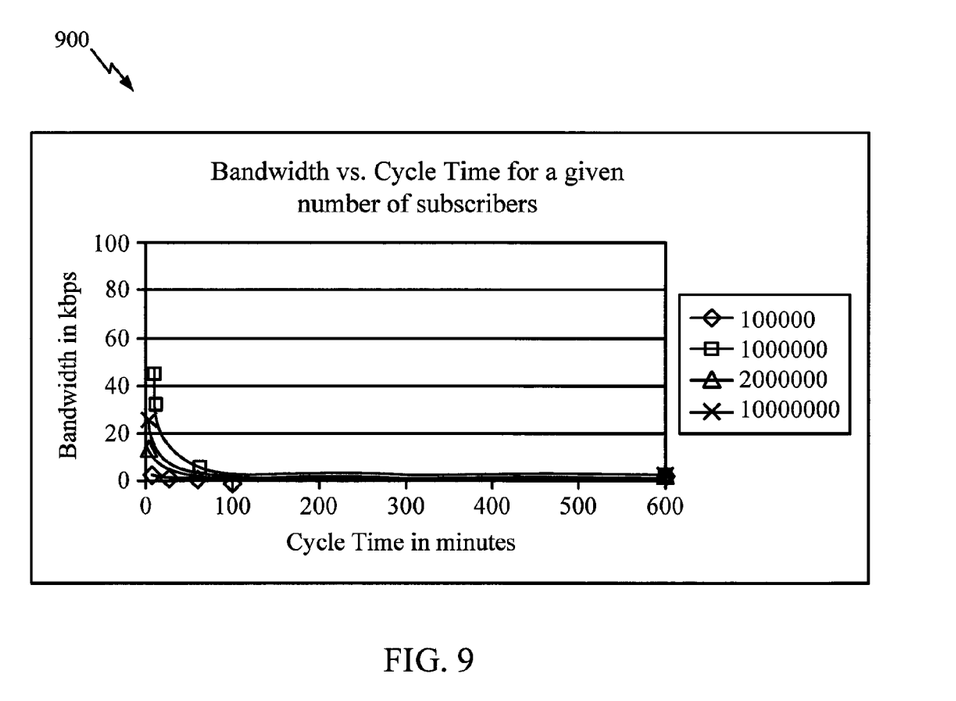
FIG. 9 is an illustration of an example graph illustrating the relationship between bandwidth and cycle time for a given number of subscribers in accordance with another aspect.

Turning now to FIG. 9, illustrated is a graph 900 comparing the bandwidth in kbps on the y-axis versus the cycle time in minutes on the x-axis. As the number of subscribers increases, the reduction of bandwidth becomes significant as cycle time increases. Using the aspects discussed above the cycle time may be increased, resulting in bandwidth reduction. The bandwidth saved may be used for content delivery.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for a distributor to control access to distributed content, comprising:
    receiving subscriber information for a plurality of subscribers authorized to receive one or more portions of distributed content;
    classifying the plurality of subscribers as a member of one of a plurality of groups according to a grouping function and further based on the respective subscriber information;
    defining one or more group-specific access mechanisms for each of the plurality of groups, wherein each of the one or more group-specific access mechanisms provides access to the one or more portions of distributed content;
    determining a group-specific entitlement management message window within an entitlement management message (EMM) for each of the plurality of groups, wherein each group-specific entitlement management message window corresponds to specified time of a broadcast of the one or more group-specific access mechanisms corresponding to the respective one of the plurality of groups;
    providing the plurality of subscribers with a respective group-specific entitlement management message window, wherein an occurrence of each group-specific entitlement management message window is operable to cause a communication device of the respective subscriber to tune to a broadcast channel to receive the entitlement management message; and
    broadcasting the EMM comprising the respective group-specific access mechanisms with the respective group-specific entitlement management message windows.

2. The method of claim 1, wherein classifying further comprises:
    classifying based on at least one of subscription packages, membership level, device type, or access type.

3. The method of claim 1, wherein determining the group-specific entitlement management message window further comprises:
    determining based on at least one of total number of subscribers, subscription packages, membership level, device type, or access type.

4. The method of claim 1, wherein broadcasting the EMM further comprises broadcasting on a first frequency, and wherein the one or more group-specific access mechanisms correspond to encrypted content broadcast on more than one frequency.

5. The method of claim 1, further comprising:
    obtaining the one or more portions of distributed content;
    encrypting the one or more portions of distributed content to define one or more portions of encrypted content, wherein the one or more portions of encrypted content are operable to be decrypted by a respective one of the one or more group-specific access mechanisms; and
    transmitting the encrypted content.

6. The method of claim 1, further comprising:
    providing each subscriber within a respective group with a rights encryption key;
    encrypting a service encryption key for the respective group with the rights encryption key to define an encrypted service encryption key for the group;
    wherein broadcasting the EMM including the access mechanisms further comprises broadcasting the encrypted service encryption keys for each group, wherein the encrypted service encryption keys are operable to be decrypted by the corresponding rights encryption key provided to the respective subscriber to enable access to the service encryption keys.

7. The method of claim 6, further comprising:
broadcasting an entitlement control message (ECM) comprising an encrypted control word;
wherein the control word is encrypted by the service encryption keys for each group, wherein the encrypted control words are operable to be decrypted by the corresponding service encryption keys at the respective subscribers to enable access to the control words.

8. The method of claim 7, further comprising:
broadcasting encrypted content encrypted by the control word, wherein the encrypted content is operable to be decrypted by the control words at the respective subscribers to enable access to the content.

9. At least one processor configured for a distributor to control access to distributed content, comprising:
a first module for receiving subscriber information for a plurality of subscribers authorized to receive one or more portions of distributed content;
a second module for classifying the plurality of subscribers as a member of one of a plurality of groups according to a grouping function and further based on the respective subscriber information;
a third module for defining one or more group-specific access mechanisms for each of the plurality of groups, wherein each of the one or more group-specific access mechanisms provides access to the one or more portions of distributed content;
a fourth module for determining a group-specific entitlement management message window within an entitlement management message for each of the plurality of groups, wherein each group-specific entitlement management message window corresponds to specified time of a broadcast of the one or more group-specific access mechanisms corresponding to the respective one of the plurality of groups;
a fifth module for providing the plurality of subscribers with a respective group-specific entitlement management message window, wherein an occurrence of each group-specific entitlement management message window is operable to cause a communication device of the respective subscriber to tune to a broadcast channel to receive the entitlement management message; and
a sixth module for broadcasting the entitlement management message comprising the respective group-specific access mechanisms with the respective group-specific entitlement management message windows.

10. A computer program product, comprising:
a non-transitory computer-readable medium comprising:
a first set of codes for causing a computer to receive subscriber information for a plurality of subscribers authorized to receive one or more portions of distributed content;
a second set of codes for causing the computer to classify the plurality of subscribers as a member of one of a plurality of groups according to a grouping function and further based on the respective subscriber information;
a third set of codes for causing the computer to define one or more group-specific access mechanisms for each of the plurality of groups, wherein each of the one or more group-specific access mechanisms provides access to the one or more portions of distributed content;
a fourth set of codes for causing the computer to determine a group-specific entitlement management message window within an entitlement management message for each of the plurality of groups, wherein each group-specific entitlement management message window corresponds to specified time of a broadcast of the one or more group-specific access mechanisms corresponding to the respective one of the plurality of groups;
a fifth set of codes for causing the computer to provide the plurality of subscribers with a respective group-specific entitlement management message window, wherein an occurrence of each group-specific entitlement management message window is operable to cause a communication device of the respective subscriber to tune to a broadcast channel to receive the entitlement management message; and
a sixth set of codes for causing the computer to broadcast the entitlement management message comprising the respective group-specific access mechanisms with the respective group-specific entitlement management message windows.

11. An apparatus, comprising:
hardware means for receiving subscriber information for a plurality of subscribers authorized to receive one or more portions of distributed content;
means for classifying the plurality of subscribers as a member of one of a plurality of groups according to a grouping function and further based on the respective subscriber information;
means for defining one or more group-specific access mechanisms for each of the plurality of groups, wherein each of the one or more group-specific access mechanisms provides access to the one or more portions of distributed content;
means for determining a group-specific entitlement management message window within an entitlement management message for each of the plurality of groups, wherein each group-specific entitlement management message window corresponds to specified time of a broadcast of the one or more group-specific access mechanisms corresponding to the respective one of the plurality of groups;
means for providing the plurality of subscribers with a respective group-specific entitlement management message window, wherein an occurrence of each group-specific entitlement management message window is operable to cause a communication device of the respective subscriber to tune to a broadcast channel to receive the entitlement management message; and
means for broadcasting the entitlement management message comprising the respective group-specific access mechanisms with the respective group-specific entitlement management message windows.

12. An apparatus, comprising:
a grouping hardware component operable to receive subscriber information for a plurality of subscribers authorized to receive one or more portions of distributed content, and further operable to classify the plurality of subscribers as a member of one of a plurality of groups according to a grouping function and further based on the respective subscriber information;
a determiner component operable to define one or more group-specific access mechanisms for each of the plurality of groups, wherein each of the one or more group-specific access mechanisms provides access to the one or more portions of distributed content, wherein the determiner component is further to determine a group-specific entitlement management message window within an entitlement management message for each of the plurality of groups, wherein each group-specific entitlement management message window corresponds to specified time of a broadcast of the one or more group-specific access mechanisms corresponding to the respective one of the plurality of groups; and a distribution component operable to provide the plurality of subscribers with a respective group-specific entitlement management message window, wherein an occurrence of each group-specific entitlement management message window is operable to cause a communication device of the respective subscriber to tune to a broadcast channel to receive the entitlement management message, and wherein the distribution component is further operable to broadcast the entitlement management message comprising the respective group-specific access mechanisms with the respective group-specific entitlement management message windows.

13. The apparatus of claim 12, wherein the grouping hardware component is further operable to classify based on at least one of subscription packages, membership level, device type, or access type.

14. The apparatus of claim 12 wherein the group-specific entitlement management message window is determined based on at least one of total number of subscribers, subscription packages, membership level, device type, or access type.

15. The apparatus of claim 12, wherein the distribution component comprises a broadcast component operable to broadcast the EMM on a first frequency, and wherein the one or more group-specific access mechanisms correspond to encrypted content broadcast on more than one frequency.

16. The apparatus of claim 12, wherein the distribution component is further operable to obtain the one or more portions of distributed content, wherein the encryption component is further operable to encrypt the one or more portions of distributed content to define a respective encrypted content, wherein the one or more portions of encrypted content are operable to be accessed using one of the respective group-specific access mechanisms.

17. The apparatus of claim 12, wherein the distribution component is further operable to provide each subscriber within a respective group with a rights encryption key, wherein the determiner component is further operable to encrypt the respective service encryption key corresponding to each group with the respective rights encryption key to define a respective encrypted service encryption key, and wherein the EMM including the respective encrypted service encryption keys, wherein the encrypted service encryption keys are operable to be decrypted by the corresponding rights encryption key provided to each respective subscriber to enable access to the service encryption keys.

18. The apparatus of claim 17, wherein the distribution component is further operable to broadcast an entitlement control message (ECM) comprising an encrypted control word, wherein the control word is encrypted by the service encryption keys for each group, and wherein the encrypted control words are operable to be decrypted by the corresponding service encryption keys provided to each respective subscriber to enable access to the control words.

19. The apparatus of claim 16, wherein the distribution component is further operable to broadcast encrypted content encrypted by the control word, wherein the encrypted content is operable to be decrypted by the control words at the respective subscribers to enable access to the content.

20. A method for a communication device to obtain an entitlement management message (EMM) in a communication system, the method comprising:

receiving, at a communication device and from a distribution system, a group-specific EMM broadcast window determined for an identified group of a plurality of groups of communication devices, wherein the group-specific EMM broadcast window comprises a specified time, wherein the communication device is a member of the identified group;

tuning by the communication device to a broadcast channel, based on an occurrence of the specified time, to listen for the EMM during the group-specific EMM broadcast window; and receiving the EMM from the distribution system during the group-specific EMM broadcast window.

21. The method of claim 20, wherein tuning by the communication device to a broadcast channel, further comprises:

waking up to receive the EMM from the distribution system during the group-specific EMM broadcast window; and returning to a sleep state after receiving the EMM.

22. The method of claim 20, further comprising:

presenting, prior to receiving the EMM and via a user interface of the communication device, service start time information based on the group-specific EMM broadcast window.

23. The method of claim 20, wherein receiving the EMM further comprises receiving a broadcast of the EMM on a first frequency, and wherein the one or more group-specific access mechanisms correspond to encrypted content broadcast on more than one frequency.

24. The method of claim 20, wherein receiving the EMM further comprises receiving a service encryption key, and further comprising:

receiving encrypted content from the distribution system;

receiving an entitlement control message including an encrypted control word;

decrypting the encrypted control word using the service encryption key; and decrypting the encrypted content using the control word.

25. The method of claim 24, wherein receiving the service encryption key further comprises receiving an encrypted service encryption key, further comprising decrypting the encrypted service encryption key with a previously received rights encryption key.

26. At least one processor configured for a communication device to obtain an entitlement management message (EMM) in a communication system, the processor comprising:

a first module for receiving, at a communication device and from a distribution system, a group-specific EMM broadcast window determined for an identified group of a plurality of groups of communication devices, wherein the group-specific EMM broadcast window comprises a specified time, wherein the communication device is a member of the identified group;

a second module for tuning by the communication device to a broadcast channel, based on an occurrence of the specified time, to listen for the EMM during the group-specific EMM broadcast window; and a third module for receiving the EMM from the distribution system during the group-specific EMM broadcast window.

27. A computer program product, comprising:

a non-transitory computer-readable medium comprising:

a first set of codes for causing a computer to receive, at a communication device and from a distribution system, a group-specific EMM broadcast window determined for an identified group of a plurality of groups of communication devices, wherein the group-specific EMM broadcast window comprises a specified time, wherein the communication device is a member of the identified group;

a second set of codes for causing the computer to tune by the communication device to a broadcast channel, based on an occurrence of the specified time, to listen for the EMM during the group-specific EMM broadcast window; and a third set of codes for causing the computer to receive the EMM from the distribution system during the group-specific EMM broadcast window.

28. An apparatus, comprising:
means for receiving, at a communication device and from a distribution system, a group-specific EMM broadcast window determined for an identified group of a plurality of groups of communication devices, wherein the group-specific EMM broadcast window comprises a specified time, wherein the communication device is a member of the identified group;
means for tuning by the communication device to a broadcast channel, based on an occurrence of the specified time, to listen for the EMM during the group-specific EMM broadcast window; and
means for receiving the EMM from the distribution system during the group-specific EMM broadcast window.

29. A communication device, comprising:
a conditional access module operable to receive, from a distribution system, a group-specific EMM broadcast window determined for an identified group of a plurality of groups of communication devices, wherein the group-specific EMM broadcast window comprises a specified time, wherein the communication device is a member of the identified group;
wherein the conditional access module is further operable to tune the communication device to a broadcast channel, based on an occurrence of the specified time, to listen for the EMM during the group-specific EMM broadcast window; and
wherein the conditional access module is further operable to receive the EMM from the distribution system during the group-specific EMM broadcast window.

30. The communication device of claim 29, wherein the conditional access module is further operable to wake the communication device from a sleep state during the group-specific EMM broadcast window to receive the EMM, and to allow the communication device to return to the sleep state after the group-specific EMM broadcast window.

31. The communication device of claim 29, wherein the conditional access module is further operable to present, prior to receiving the EMM and via a user interface of the communication device, service start time information based on the group-specific EMM broadcast window.

32. The communication device of claim 29, wherein the conditional access module is further operable to receive the EMM via a broadcast on a first frequency, and wherein the one or more group-specific access mechanisms correspond to encrypted content broadcast on more than one frequency.

33. The communication device of claim 29, wherein the conditional access module is further operable to receive a service encryption key, to receive encrypted content from the distribution system, to receive an entitlement control message including an encrypted control word, to decrypt the encrypted control word using the service encryption key, and to decrypt the encrypted content using the control word.

34. The communication device of claim 33, wherein the conditional access module is further operable to decrypt the encrypted service encryption key with a previously received rights encryption key.

35. A method for a distributor to control access to distributed content, comprising:
receiving subscriber information for a plurality of subscribers authorized to receive one or more portions of distributed content;
classifying each of the plurality of subscribers as a member of one of a plurality of groups based on the received subscriber information;
transmitting a entitlement management message window to each of the plurality of groups, wherein each entitlement management message window defines a time period during which subscribers of each group receive one or more access mechanisms pertaining to the group for enabling the subscribers of the group to receive distributed content authorized to the group; and
broadcasting an entitlement management message comprising the one or more access mechanisms to the plurality of groups.

36. The method of claim 35, further comprising: defining the one or more access mechanisms for each of the plurality of groups.

37. The method of claim 35, further comprising: defining the entitlement management message window within the entitlement management message for each of the plurality of groups.

38. The method of claim 37, wherein defining the entitlement management message window is based on at least one of total number of subscribers, subscription packages, membership level, device type, or access type.

39. The method of claim 35, wherein the entitlement management message window is operable to cause a subscriber to tune to a broadcast channel in order to receive the entitlement management message.

40. The method of claim 35, wherein the entitlement management message window is included within the entitlement management message.

41. The method of claim 35, wherein classifying each of the plurality of subscribers is based on at least one of subscription packages, membership level, device type, or access type.

42. The method of claim 35, wherein:
the entitlement management message is broadcast on a first frequency, and
the one or more access mechanisms correspond to encrypted content broadcast on a plurality of frequencies.

43. The method of claim 35, further comprising:
obtaining the one or more portions of distributed content;
encrypting the one or more portions of distributed content to define one or more portions of encrypted content, wherein the one or more portions of encrypted content are operable to be decrypted by one of the one or more access mechanisms; and
transmitting the encrypted content.

44. The method of claim 35, further comprising:
providing each subscriber of each of the plurality of groups with a rights encryption key;
encrypting a service encryption key for each group with the respective rights encryption key to define an encrypted service encryption key for the group;

wherein the broadcasting further comprises broadcasting the encrypted service encryption keys for each group, wherein the encrypted service encryption keys are operable to be decrypted by the corresponding rights encryption key provided to the respective subscriber to enable access to the service encryption keys.

45. The method of claim 44, further comprising:
broadcasting an entitlement control message comprising an encrypted control word;
wherein the control word is encrypted by the service encryption keys for each group, and wherein the encrypted control words are operable to be decrypted by the corresponding service encryption keys at the respective subscribers to enable access to the control words.

46. The method of claim 45, further comprising:
broadcasting encrypted content encrypted by the control word, wherein the encrypted content is operable to be decrypted by the control words at the respective subscribers to enable access to the distributed content.

47. A method of obtaining an entitlement management message in a communication system, the method performed by a communication device and comprising:
receiving an entitlement management message window determined for an identified group of a plurality of groups of communication devices, wherein the entitlement management message window defines a time period during which subscribers of the identified group receive one or more access mechanisms pertaining to the group for enabling the subscribers of the group to receive distributed content authorized to the group; and
receiving an entitlement management message during the entitlement management message window.

48. The method of claim 47, further comprising:
powering on from a sleep state to receive the entitlement management message from a distribution system during the entitlement management message window; and
returning to the sleep state after receiving the entitlement management message.

49. The method of claim 47, further comprising:
presenting, prior to receiving the entitlement management message and via a user interface of the communication device, service start time information based on the entitlement management message window..

50. The method of claim 47, wherein receiving the entitlement management message further comprises receiving a broadcast of the entitlement management message on a first frequency, and wherein the one or more access mechanisms correspond to encrypted content broadcasts on more than one frequency.

51. The method of claim 47, wherein receiving the entitlement management message further comprises receiving a service encryption key, and further comprising:
receiving encrypted content from a distribution system;
receiving an entitlement control message including an encrypted control word;
decrypting the encrypted control word using he service encryption key; and
decrypting the encrypted content using the control word.

52. The method of claim 51, wherein receiving the service encryption key further comprises receiving an encrypted service encryption key, further comprising decrypting the encrypted service encryption key with a previously received rights encryption key.

* * * * *